UNITED STATES PATENT OFFICE.

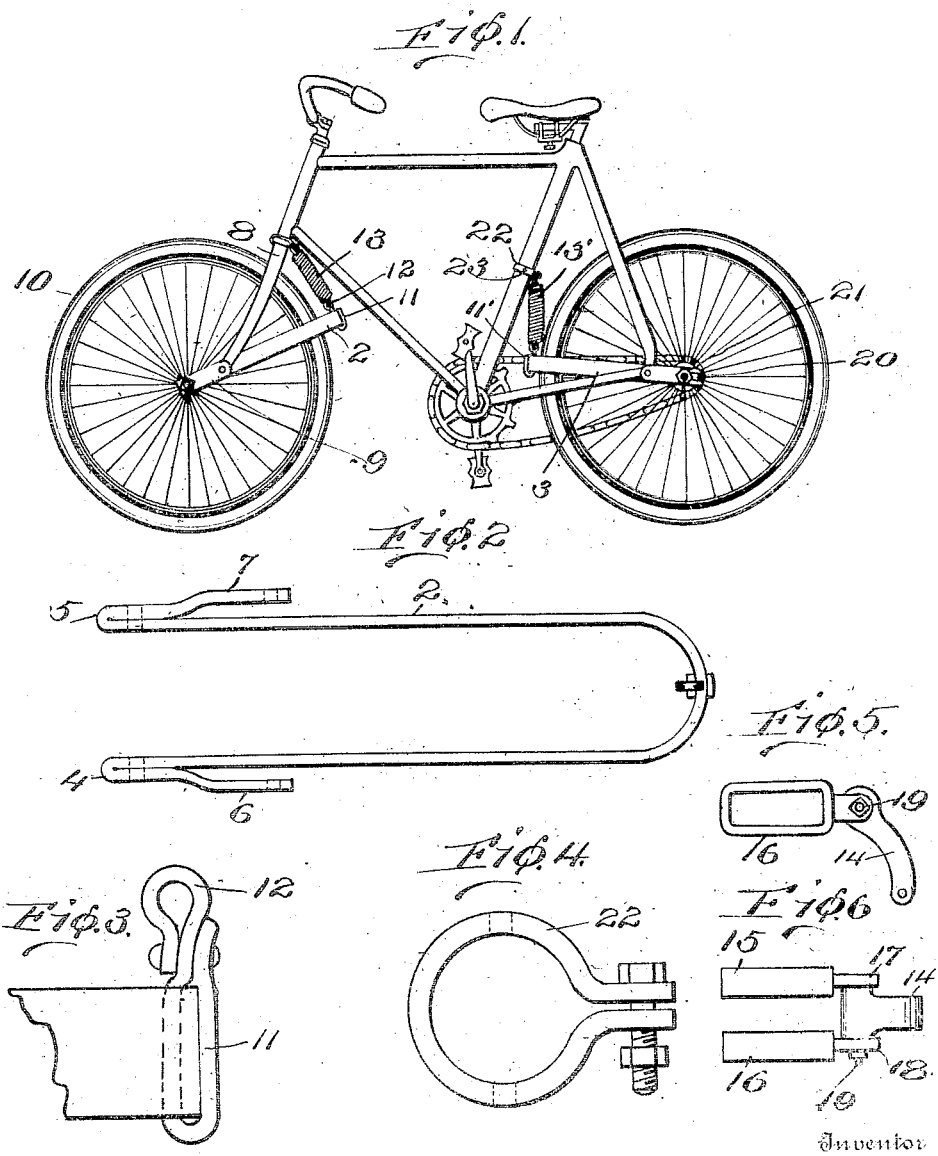

JOHN KUEBODEAUX, OF CROWLEY, LOUISIANA, ASSIGNOR OF ONE-HALF TO DANIEL PIERCE HAVEN, OF CROWLEY, LOUISIANA.

WHEELED VEHICLE.

953,697.

Specification of Letters Patent. Patented Apr. 5, 1910.

Application filed September 4, 1909. Serial No. 516,281.

*To all whom it may concern:*

Be it known that I, JOHN KUEBODEAUX, a citizen of the United States, residing at Crowley, in the parish of Acadia and State of Louisiana, have invented certain new and useful Improvements in Wheeled Vehicles; and I do hereby declare the following to be a full, clear, and exact description of the invention, such as will enable others skilled in the art to which it appertains to make and use the same.

This invention relates to improvements in vehicles, and is particularly adapted for bicycles.

The object in view is the arrangement of cushioning means upon vehicles which do not interfere with the proper guiding, propulsion, and action of the vehicles, but affords any desired cushioning effect.

Another object in view is the arrangement in a bicycle of cushioning means interposed between the frame of the bicycle and the axle of the wheels for cushioning the frame without interfering with the propelling mechanism of the bicycle.

A still further object of the invention is the arrangement in a bicycle of a front and rear fork for carrying the wheels upon which are pivotally mounted the ordinary frame of a bicycle, the forks being also connected with the frame of the bicycle by a cushioning spring, whereby vibration is taken up.

With these and other objects in view the invention comprises certain novel constructions, combinations and arrangement of parts as will be hereinafter more fully described and claimed.

In the accompanying drawings: Figure 1 is a side elevation of a bicycle embodying the invention. Fig. 2 is an enlarged top plan view of one of the forks. Fig. 3 is an enlarged detail fragmentary view of one of the forks with a spring engaging member secured thereby. Fig. 4 is a top plan view of a clamp. Fig. 5 is a side elevation of a spring retaining member designed to be connected with the front forks of the bicycle. Fig. 6 is a top plan view of the structure shown in Fig. 5.

Referring to the accompanying drawings by numerals, 1 indicates a frame of an ordinary bicycle and 2 and 3 front and rear forks embodying certain features of the invention. Front fork 2 is preferably made from a single strip of material, and is arranged substantially U shaped, as shown in Fig. 2, and is bent upon itself at 4 and 5 respectively for forming offset portions 6 and 7. The offset portions 6 and 7 are provided with apertures for receiving suitable bolts that also pass through the front forks 8 of the bicycle 1. The bolts are passed through the front forks 8 and offset portions 6 and 7 preferably also pass through suitable apertures formed in the body portion of fork 2 so as to have a double bearing and to permit the free movement of the fork 2 as well as fork 8. The front axle 9 is passed through the front of the fork 2 and through the front wheel 10 in the usual manner for connecting fork 2 to wheel 10. Fork 2 is provided at its rear end with a spring receiving member 11 that preferably encircles the end of fork 2 as more clearly shown in Fig. 3, and has the ends thereof riveted or firmly secured in any other desired manner. Member 11 is formed with an eye 12 for receiving one end of spring 13. The opposite end of spring 13 is secured in a depending member 14, which is preferably pivotally connected to members 15 and 16 that encircle the upper end of fork 8. Members 15 and 16 are provided with ears 17 and 18 which accommodate a bolt 19. Bolt 19 also passes through the upper end of member 14, and consequently pivotally connects members 15 and 16 together and to member 14.

Spring 13 may be made of any desired size or strength for providing any desired cushioning effect, the spring being usually varied to agree with the load designed to be carried.

The rear fork 3 is made similar to the front fork 2, except that the same is provided with an elongated slot 20 for permitting proper adjusting of the rear axle 21. Connected to the spring receiving member 11' of rear fork 3 is a spring 13' secured to a clamp 22, which preferably has a pin 23 passing therethrough, and also through the bracing tube of the bicycle frame 1. If desired the pin 23 could be eliminated, though the same ordinarily is used to prevent any accidental sliding motion of the clamp 22.

What I claim is:

In a device of the character described, a frame, a plurality of wheels, a fork for each of said wheels bent upon itself at the ends for forming offset portions, means passing through said offset portions and part of said
5 frame for pivotally connecting said frame to said forks, and cushioning means secured to each of said forks and to said frame.

In testimony whereof I affix my signature in presence of two witnesses.

JOHN KUEBODEAUX.

Witnesses:
J. M. LYONS,
W. W. HIGGINBOTHAM.